(12) United States Patent
Zeng et al.

(10) Patent No.: US 11,033,112 B2
(45) Date of Patent: Jun. 15, 2021

(54) BED BODY

(71) Applicant: Guohong Zeng, Qingyuan (CN)

(72) Inventors: Guohong Zeng, Qingyuan (CN); Gary Thomas Kinion, Farmington, AR (US); Muriel Lynn Kelley, Farmington, AR (US); Singer Theodore Louis, Farmington, AR (US)

( * ) Notice: Subject to any disclaimer, the term of this patent is extended or adjusted under 35 U.S.C. 154(b) by 0 days.

(21) Appl. No.: 16/662,077

(22) Filed: Oct. 24, 2019

(65) Prior Publication Data
US 2020/0054146 A1 Feb. 20, 2020

(51) Int. Cl.
*A47C 19/00* (2006.01)
*F16B 12/60* (2006.01)

(52) U.S. Cl.
CPC ............ *A47C 19/005* (2013.01); *F16B 12/60* (2013.01)

(58) Field of Classification Search
CPC ........ A47C 19/00; A47C 19/02; A47C 19/005
See application file for complete search history.

(56) References Cited

U.S. PATENT DOCUMENTS 5,257,428 A * 11/1993 Carroll ................. A47C 19/122
5/201

* cited by examiner

*Primary Examiner* — Fredrick C Conley
(74) *Attorney, Agent, or Firm* — HYIP

(57) ABSTRACT

The present disclosure relates to the technical field of electric beds, and in particular to a bed body, which solves a technical problem that the width of a bed body of an electric bed is inconveniently adjusted to cause high transportation cost in the prior art. The bed body comprises a bed body main unit and a bed body secondary unit arranged on one side face of the bed body main unit, the bed body main unit is connected with the bed body secondary unit through connectors, and the bed body secondary unit is detachably clamped to the bed body main unit through the connectors.

11 Claims, 10 Drawing Sheets

BED BODY

TECHNICAL FIELD

The present disclosure relates to the technical field of electric beds, and in particular to a bed body.

BACKGROUND

An electric folding bed is a conventional adjustable bed, and its bed body can be folded to meet requirements of different postures of a human body. However, transportation cost of a bed body is directly influenced by its size during transportation, and usually the larger the size of the bed body is, the higher the transportation cost is.

Generally, the electric folding bed can be folded in a length direction to reduce its size and then to reduce the transportation cost. However, for a bed having a large size and correspondingly having a long width such as 1.9 m, if its width cannot be reduced, its transportation cost cannot be further reduced in a manner of reducing the width during transportation. Secondly, a bed body having a constant width cannot be adjusted according to requirements of a consumer, for example, when the size of a bed body in use is too small and cannot meet the use requirements of the consumer, the size of the existing bed body cannot be increased, so the consumer has to buy a bed having a required size. Similarly, when the width of the existing bed body is long and cannot be reduced, the bed body has poor applicability.

SUMMARY

An objective of the present disclosure is to provide a bed body to solve a technical problem that the width of a bed body of an electric bed is inconveniently adjusted to cause high transportation cost and poor applicability in the prior art.

To achieve the above objective, the present disclosure adopts the following technical solution:

a bed body comprises a bed body main unit and a bed body secondary unit arranged on one side face of the bed body main unit, the bed body main unit is connected with the bed body secondary unit through connectors, and the bed body secondary unit is detachably clamped to the bed body main unit through the connectors.

Preferably, the connector is an L-shaped clamping plate.

Preferably, one end of the connector is connected with an upper surface of a cross beam of a side face of the bed body secondary unit, a clamping area S1 is formed between an inner surface of the connector and the cross beam of the side face of the bed body secondary unit, and the size of the clamping area S1 fits the size of a cross beam of a side face of the bed body main unit.

Preferably, a channel groove is opened in a vertical section of the inner surface of the connector, one end of the channel groove is closed, a first engagement tooth is arranged in the channel, groove, and a second engagement tooth fitting the first engagement tooth is arranged on the bed body main unit.

Preferably, one side, away from the closed end of the channel groove, of the channel groove, the first engagement tooth and the second engagement tooth is inclined downwards.

Preferably, one end of the connector is connected with a lower surface of the cross beam of the side face of the bed body main unit, a clamping area S1 is formed between the inner surface of the connector and the cross beam of the side face of the bed body main unit, and the size of the clamping area S1 fits the size of the cross beam of the side face of the bed body secondary unit.

Preferably, the connector is a channel steel shaped clamping plate formed by channel steel.

Preferably, one side face of the connector is fixedly connected with, the cross beam of the side face of the bed body secondary unit, a clamping area S1 is formed between inner surfaces of the connector, and the size of the clamping area S1 fits the size of the cross beam of the side face of the bed body main unit.

Preferably, the bottom of the vertical section of the connector is provided with a protrusion part, an end face of the protrusion part is semicircular, the cross beam of the side face of the bed body main unit is provided with a groove fitting the protrusion part, an axis of the protrusion part and an axis of the groove are superposed when the protrusion part is inserted into the groove, and a distance between the axis of the protrusion part and an inner surface of a horizontal section of the connector is equal to a distance between the axis of the groove and a top surface of the cross beam of the side face of the bed body main unit.

Compared with the prior art, the present disclosure has the following beneficial effects: due to detachable connection of the bed body main unit and the bed body secondary unit, the bed body can be separated to reduce the size so that the transportation cost can be reduced in a bed body transportation procedure, and the bed body secondary unit can be added to the bed body main unit to increase the size of the bed body, so the applicability of a bed is improved due to variable size of the bed.

BRIEF DESCRIPTION OF THE DRAWINGS

To describe the technical solutions in the embodiments of the present disclosure more clearly, the following briefly introduces the accompanying drawings for describing the embodiments. Apparently, the accompanying drawings in the following description show merely some embodiments of the present disclosure, and a person of ordinary skill in the art may still derive other drawings from these accompanying drawings without creative efforts.

Figure 1:
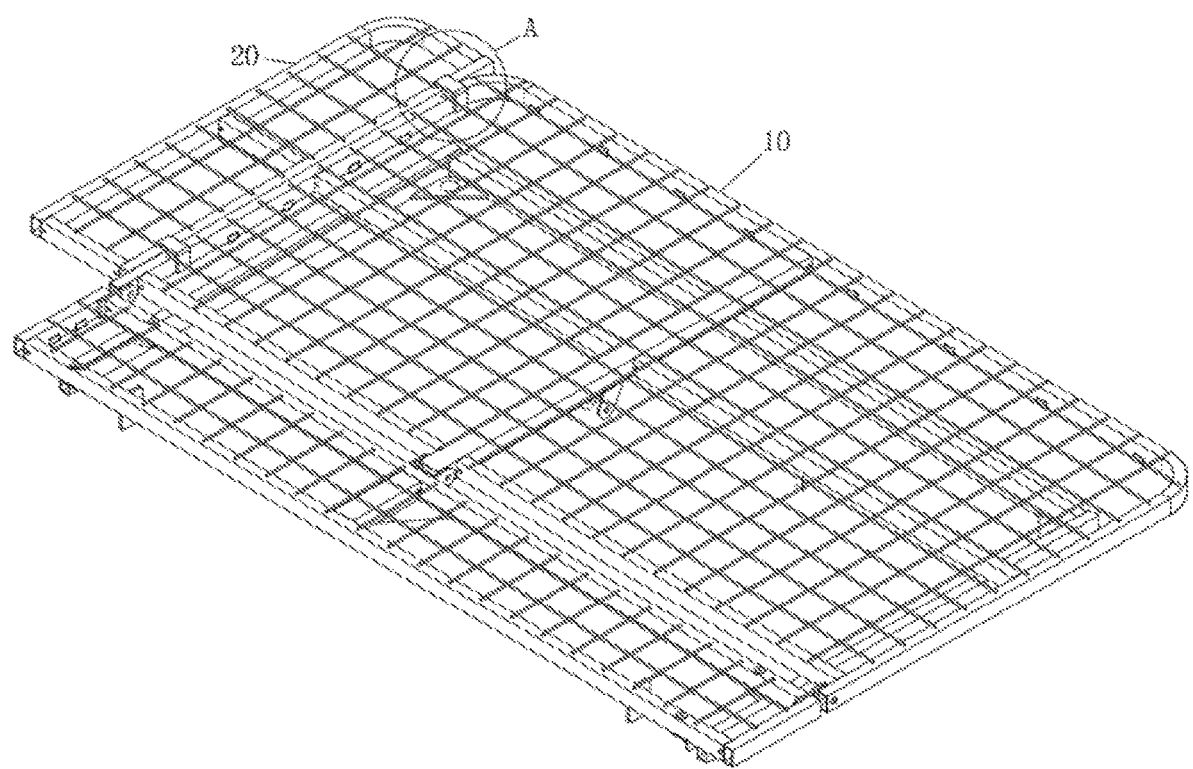
FIG. 1 is a schematic structural diagram of Embodiment 1 of the present disclosure.

In the drawings: 10-bed body main unit, 20-bed body secondary unit, 30-connector, 40-protrusion part, 50-groove, 60-circular arc surface, 70-channel groove, 80-first engagement tooth, and 90-second engagement tooth.

DESCRIPTION OF THE EMBODIMENTS

To make the objectives, technical solutions, and advantages of the present disclosure clearer, the following further describes the present disclosure in detail with reference to the accompanying drawings and embodiments. Understandably, the described specific embodiments are merely used to explain the present disclosure, rather than to limit the present disclosure.

Embodiment 1

Figure 2:
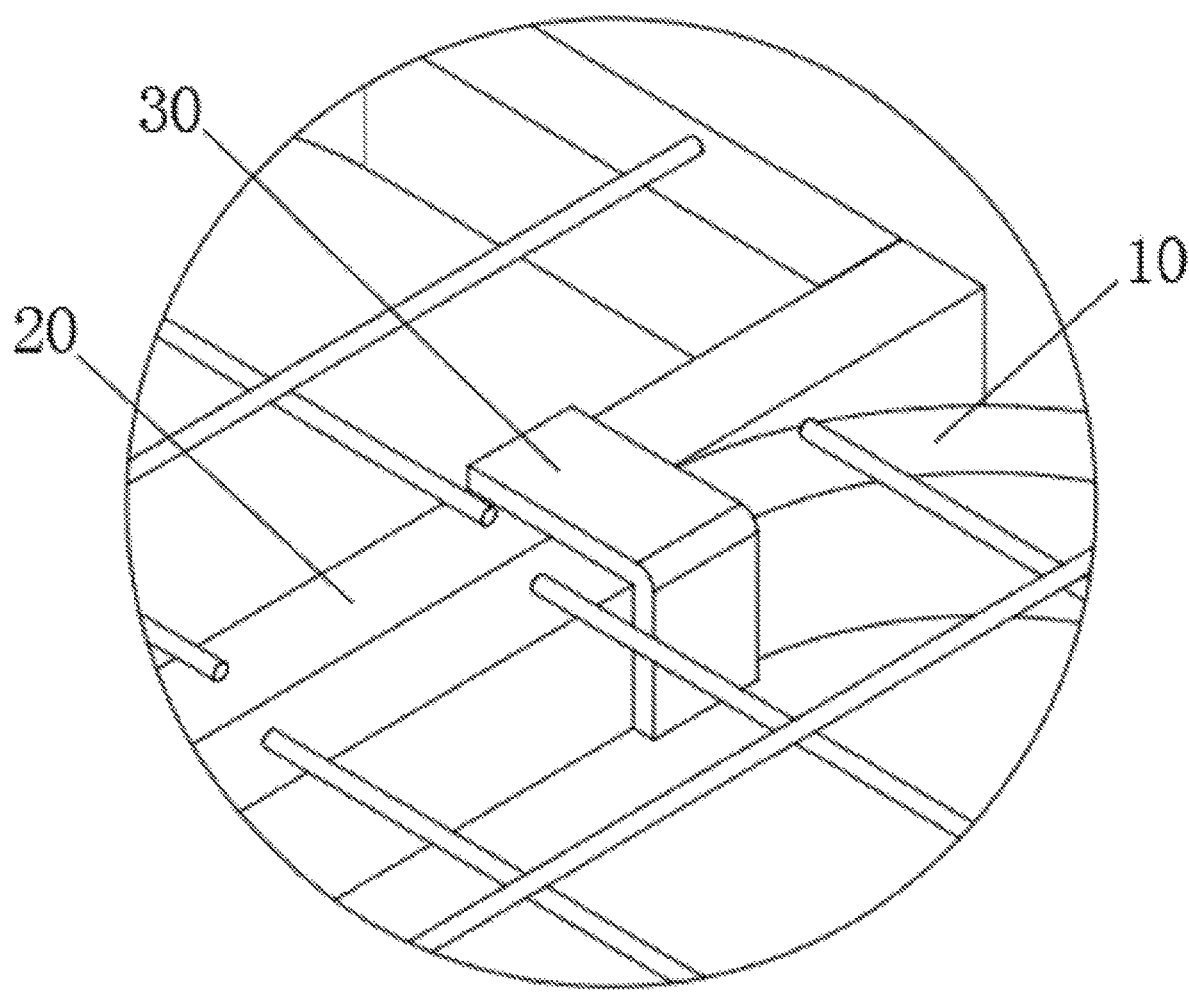
FIG. 2 is an enlarged view of a part A in FIG. 1.

Referring to FIG. 1 and FIG. 2, the embodiment provides a bed body, which comprises a bed body main unit 10 and a bed body secondary unit 20 arranged on one side face of the bed body main unit 10, the bed body main unit 10 is connected with the bed body secondary unit 20 through connectors 30, and the bed body secondary unit 20 is detachably clamped to the bed body main unit 10 through the connectors 30.

In the embodiment, the connector 30 is an L-shaped clamping plate.

Furthermore, one end of the connector 30 is connected with an upper surface of a cross beam of a side face of the bed body secondary unit 20; specifically, the connector 30 and the bed body secondary unit 20 are fixedly connected; for example, an inner surface of a horizontal section of the connector 30 can be welded with the upper surface of the cross beam of the side face of the bed body secondary unit 20 such that connection of the connector 30 and the bed body secondary unit 20 has great stability; certainly, the connector 30 can be connected with the upper surface of the cross beam of the side face of the bed body secondary unit 20 through a bolt, the connector 30 can be fixed to the bed body secondary unit 20 through the bolt, and after the bolt is unscrewed, the connector 30 located outside the bed body secondary unit 20 can be contained in the bed body secondary unit 20 in order to prevent influence on firmness and stability of a bed body after being assembled due to the fact that an outer side, which is exposed out of the bed body secondary unit 20, of the connector 30 collides other portions of the bed body to generate deformation in a transportation procedure; and a clamping area S1 is formed between an inner surface of the connector 30 and the cross beam of the side face of the bed body secondary unit 20, and the size of the clamping size S1 fits the size of a cross beam of a side face of the bed body main unit 10.

Figure 3:
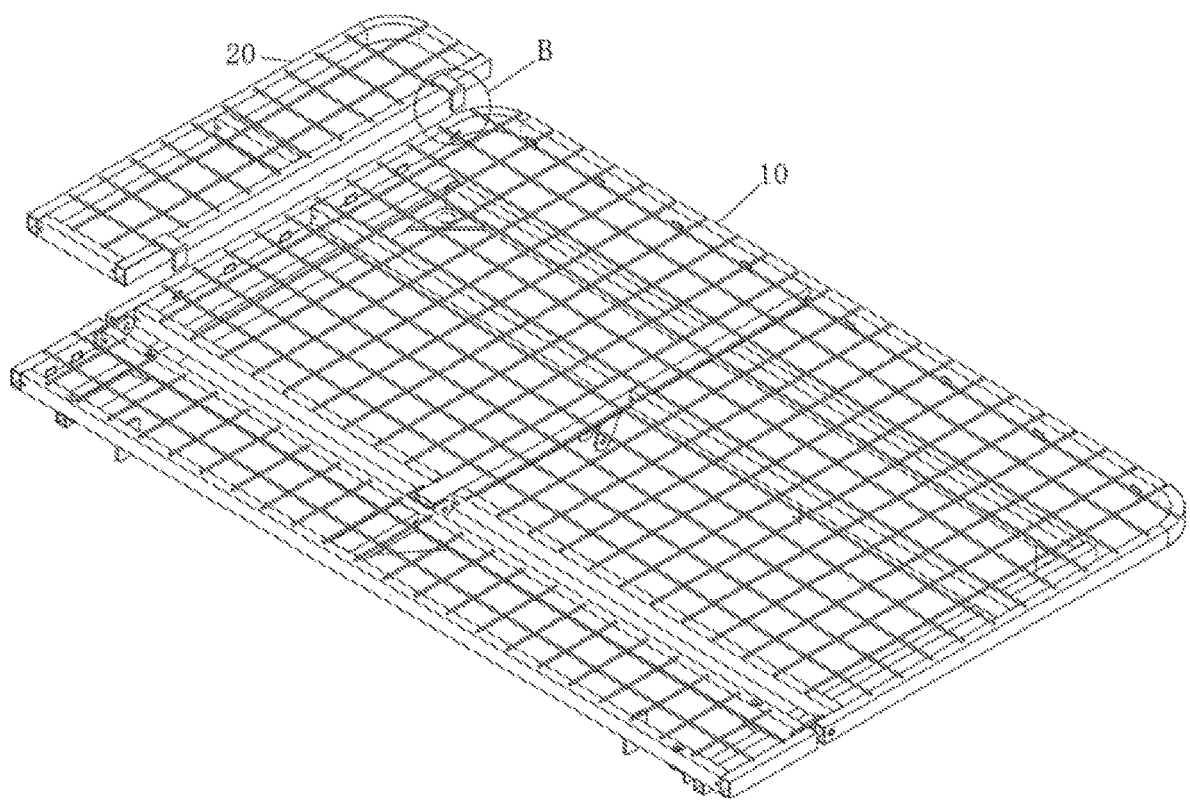
FIG. 3 is a schematic structural diagram of another embodiment in Embodiment 1 of the present disclosure.
Figure 4:
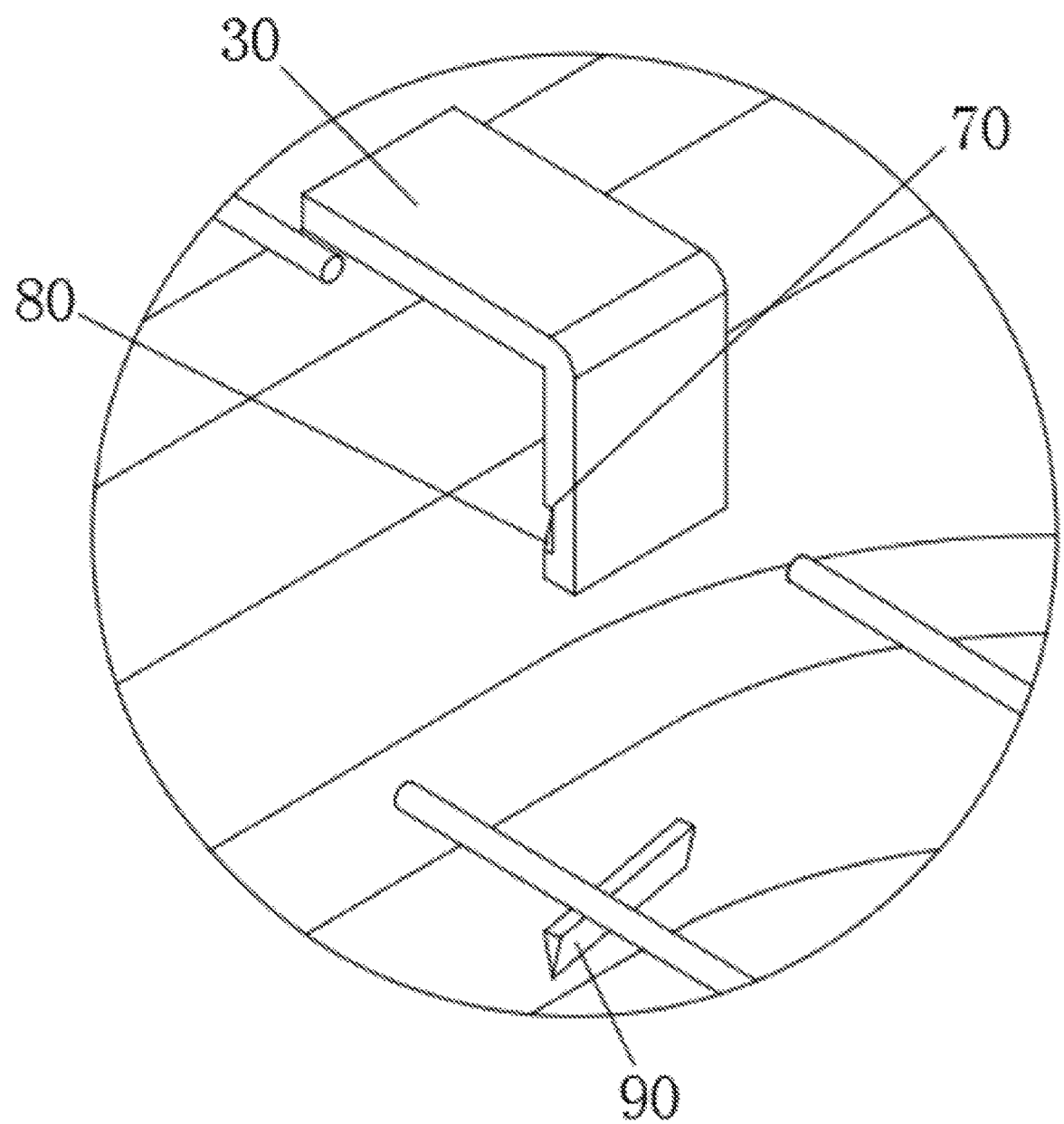
FIG. 4 is an enlarged view of a part B in FIG. 3.
Figure 5:
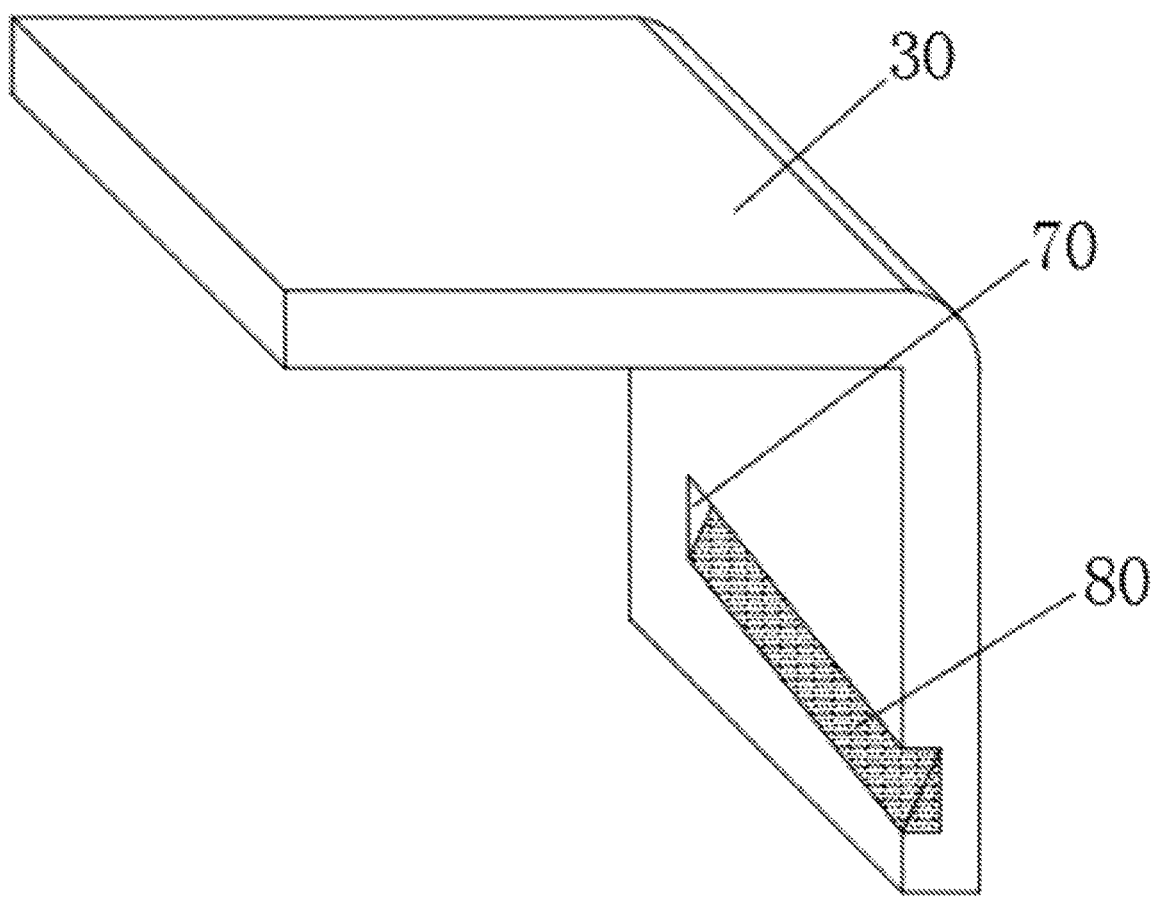
FIG. 5 is a schematic diagram of a channel groove and a first engagement tooth in FIG. 3.

In the embodiment, referring to FIG. 3, FIG. 4 and FIG. 5, preferably, a channel groove 70 is opened in a vertical section of the inner surface of the connector 30, one end of the channel groove 70 is closed, a first engagement tooth 80 is arranged in the channel groove 70, the bed body main unit 10 is provided with a second engagement tooth 90 fitting the first engagement tooth 80, and due to such arrangement, the second engagement tooth 90 can be inserted into the channel groove 70 and is engaged with the first engagement tooth 80 so as to be capable of effectively connecting the bed body secondary unit 20 with the bed body main unit 10. During operation, the vertical section of the connector 30 is placed on one side of the second engagement tooth 90 by moving the bed body secondary unit 20, then the bed body secondary unit 20 is moved to ensure that the second engagement tooth 90 is inserted into the channel groove 70, and at this time, the second engagement tooth 90 and the first engagement tooth 80 are engaged.

Furthermore, to improve stability of connection of the bed body main unit 10 and the bed body secondary unit 20 under the matching of the first engagement tooth 80, the second engagement tooth 90 and the channel groove 70, referring to FIG. 4 and FIG. 5, one side, away from the closed end of the channel groove, of the channel groove 70, the first engagement tooth 80 and the second engagement tooth 90 is inclined downwards, so, the first engagement tooth 80, the second engagement tooth 90 and the channel groove 70 are inclined after the bed body main unit 10 is connected with the bed body secondary unit 20, and at this time, if the bed body main unit 10 and the bed body secondary unit 20 need to be separated, it is necessary of a sufficient action force in parallel with an inclination direction of the channel groove 70; therefore, due to the matching of the channel groove 70, the first engagement tooth 80 and the second engagement tooth 90, a certain limitation effect can be provided for the bed body main unit 10 and the bed body secondary unit 20 in vertical and horizontal directions so that the connection between the bed body main unit 10 and the bed body secondary unit 20 is more stable.

In the embodiment, the bed body main unit 10 and the bed body secondary unit 20 are detachably connected through the connectors 30 in the bed body; in, the transportation procedure, the bed body secondary unit 20 can be detached from the bed body main unit 10 such that the size of the bed body can be reduced and then the transportation cost of the bed body can be saved, the bed body secondary unit 20 is directly pulled out of the bed body main unit 10 from top to bottom when the bed body secondary unit 20 needs to be detached from the bed body main unit 10, and then the bed body secondary unit 20 and the bed body main unit 10 can be stacked, so that the size of the bed body during transportation can be reduced, and the transportation cost is reduced; and during assembly, the clamping area S1 formed by the connector 30 and the bed body secondary unit 20 is directly aligned to the cross beam of the side face of the bed body main unit 10, then the connector 30 is directly clamped on an outer side of the cross beam of the side face of the bed body main unit 10, at this time, the bed body secondary unit 20, the bed body main unit 10 and the connector 30 form clamping connection, and stable connection between the bed body main unit 10 and the bed body secondary unit 20 can be achieved without other fasteners.

Embodiment 2

Figure 6:
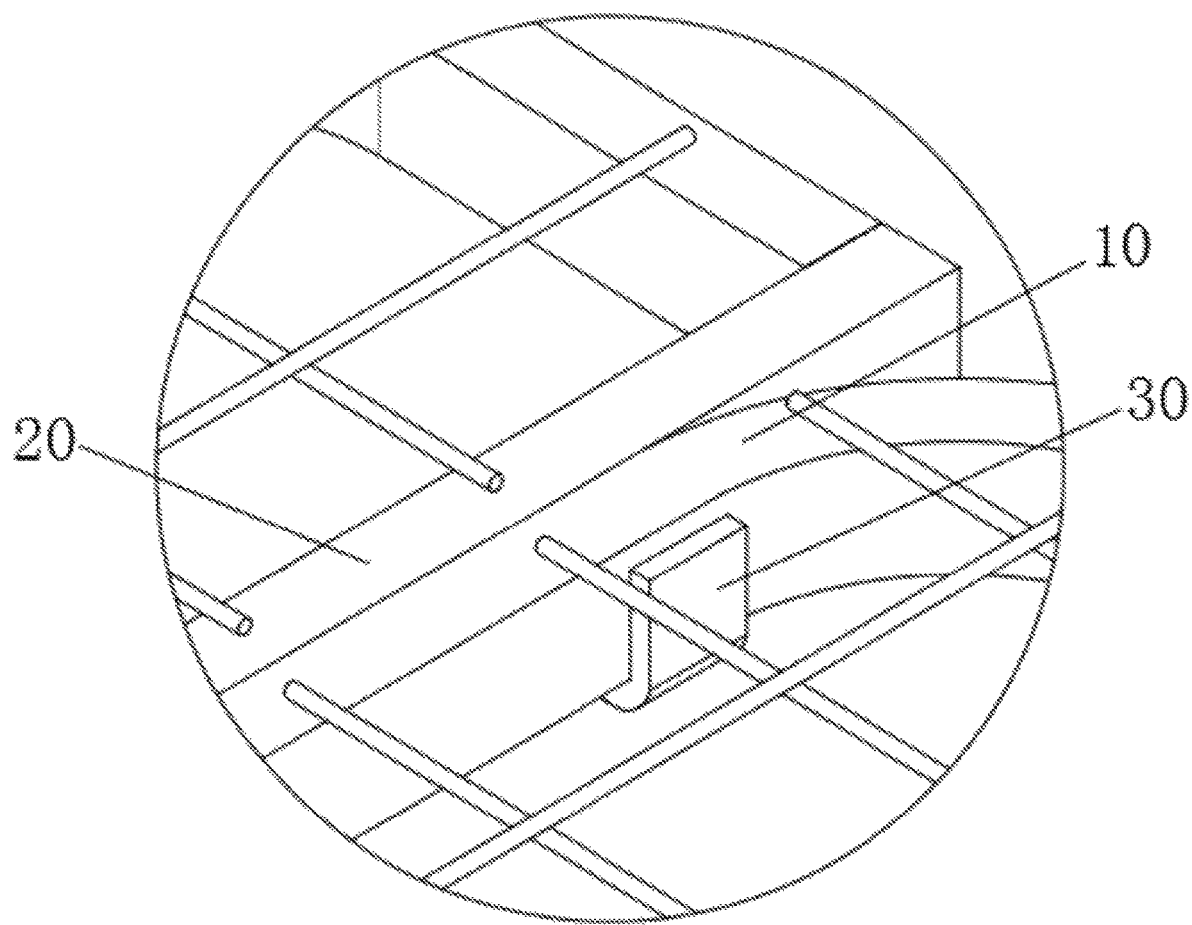
FIG. 6 is a schematic diagram of a bed body secondary unit and a connector in Embodiment 2 of the present disclosure.

Referring to FIG. 6, one end of the connector 30 is connected with the lower surface of the cross beam of the side face of the bed body secondary unit 20; specifically, the connector 30 and the cross beam of the side face of the bed body secondary unit 20 are fixed by a bolt, and after the bolt is unscrewed, the connector 30 can be contained in the bed body main unit 10 so as to not influence the appearance of the bed body main unit 10 and the independent use of the bed body main unit 10, a clamping area S1 is formed between the inner surface of the vertical section of the connector 30 and the cross beam of the side face of the bed body secondary unit 20, and the size of the clamping area S1 fits the size of the cross beam of the side face of the bed body main unit 10, and the clamping area S1 is configured to receive the cross beam of the side face of the bed body main unit 10.

Embodiment 3

Figure 7:
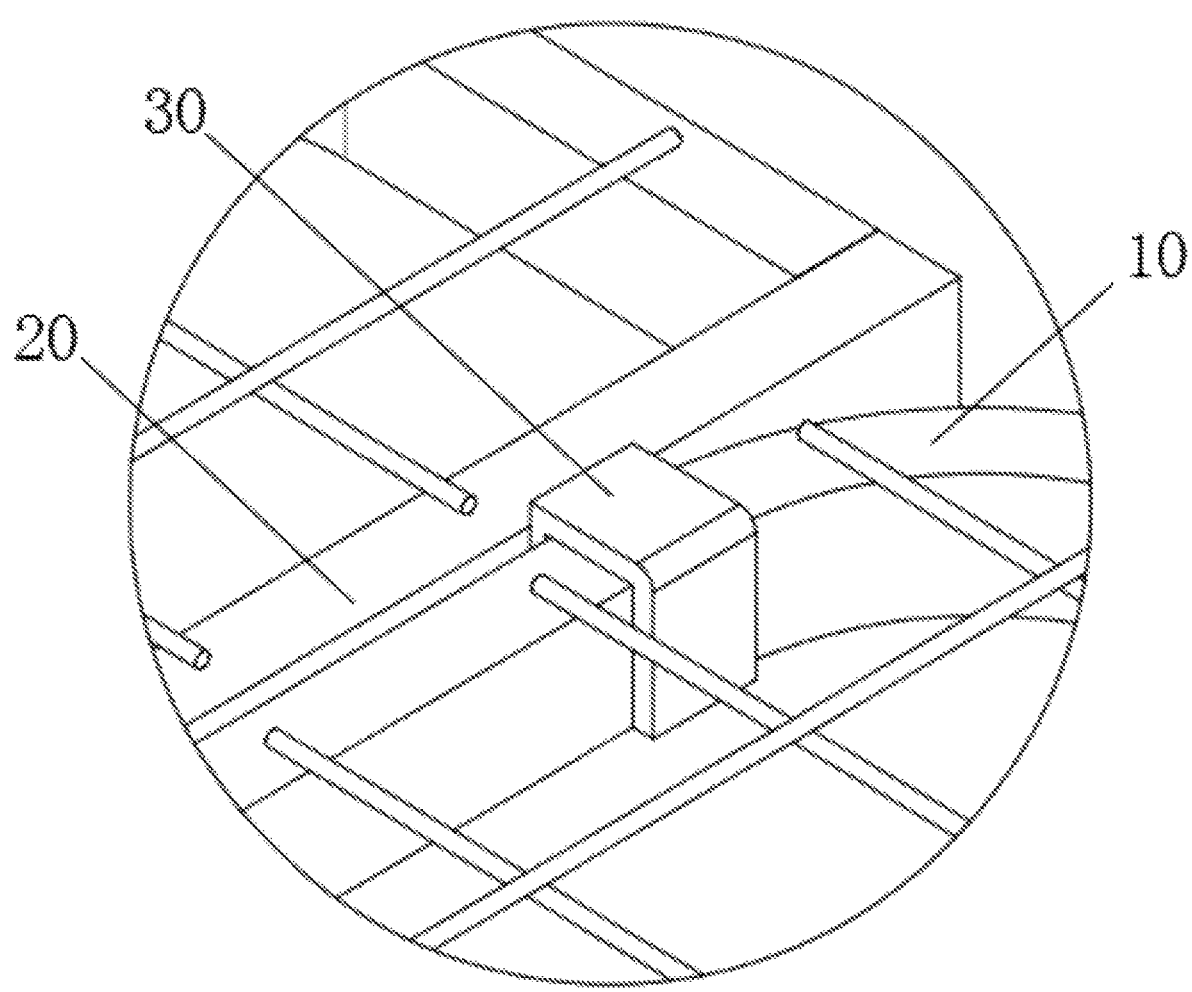
FIG. 7 is a schematic diagram showing connection of a bed body secondary unit and a bed body main unit through a connector in Embodiment 3 of the present disclosure.

Referring to FIG. 7, the connector 30 is a clamping plate formed by channel steel, one side face of the connector 30 is fixedly connected to the cross beam of the side face of the bed body secondary unit 20, a clamping area S1 is formed between inner surfaces of the connector 30, and the size of the clamping area S1 fits the size of the cross beam of the side face of the bed body main unit 10; and in Embodiment 1 and Embodiment 2, the formation of the clamping area S1 depends on welding precision between the connector 30 and the bed body main unit 10 or the bed body secondary unit 20 and has very high technical requirements on welding, but in Embodiment 3, the connector 30 can be integrally formed in a bending manner, and the clamping area S1 is formed after processing of the connector 30 is completed, so the technical requirements on the welding are low, processing difficulty is reduced, and production and processing are convenient.

Embodiment 4

Figure 8:
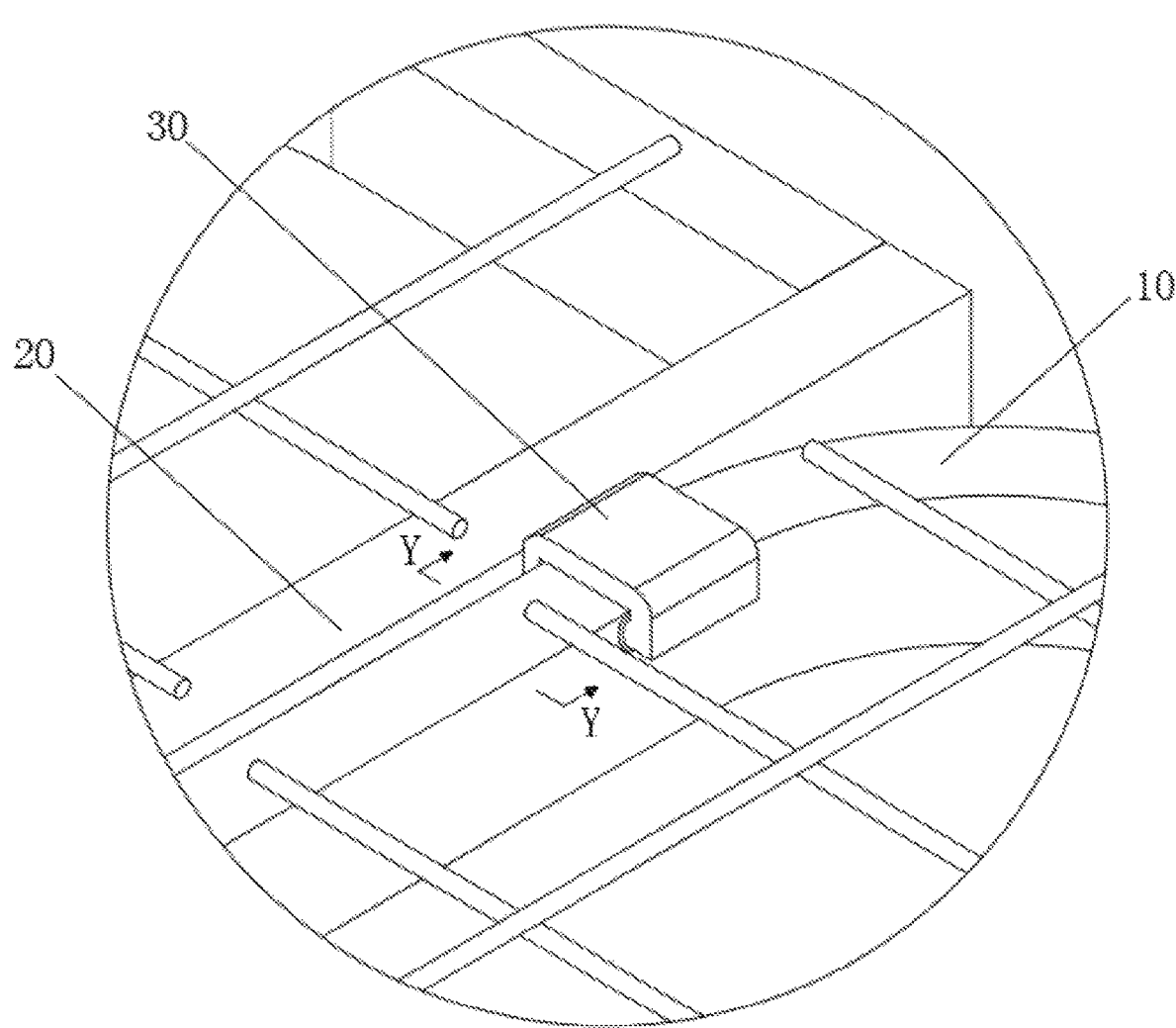
FIG. 8 is a schematic diagram showing connection of a bed body secondary unit and a bed body main unit through a connector in Embodiment 4 of the present disclosure.
Figure 9:
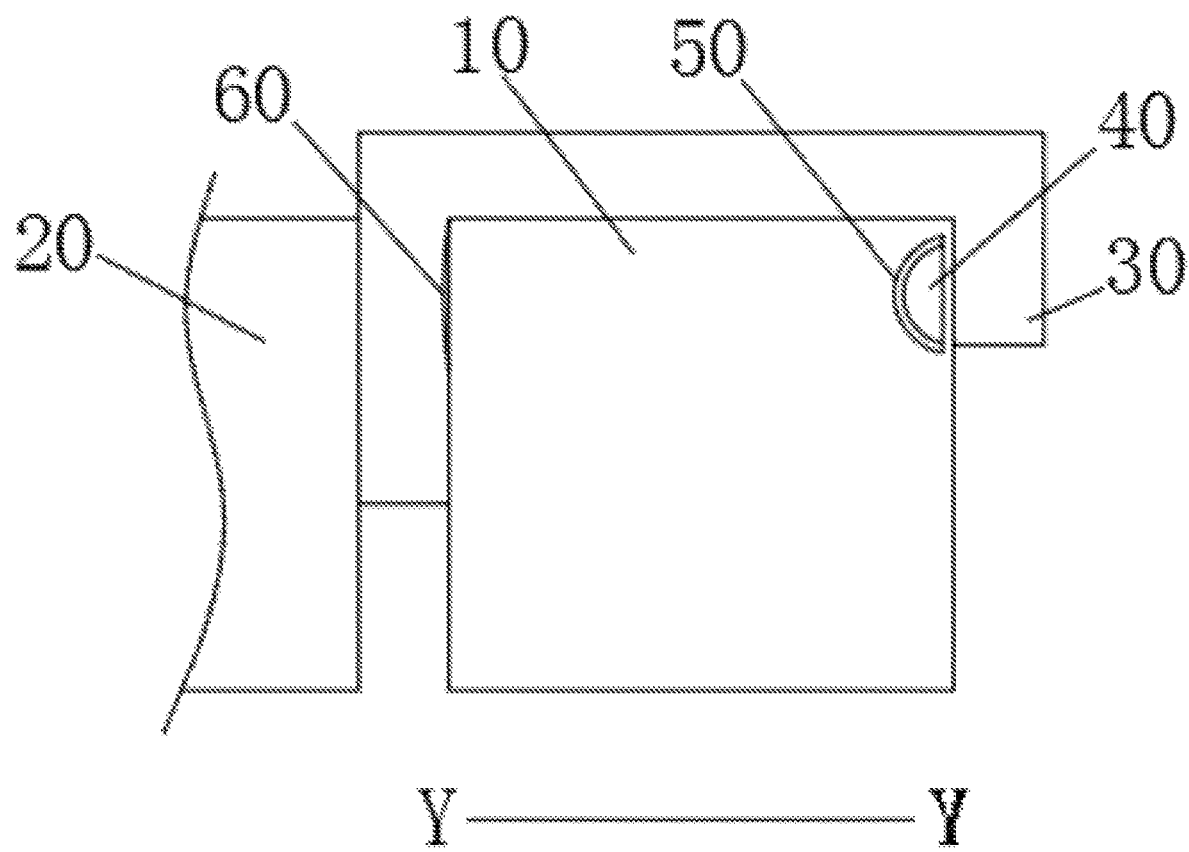
FIG. 9 is a sectional view of FIG. 8 in a Y-Y direction.
Figure 10:
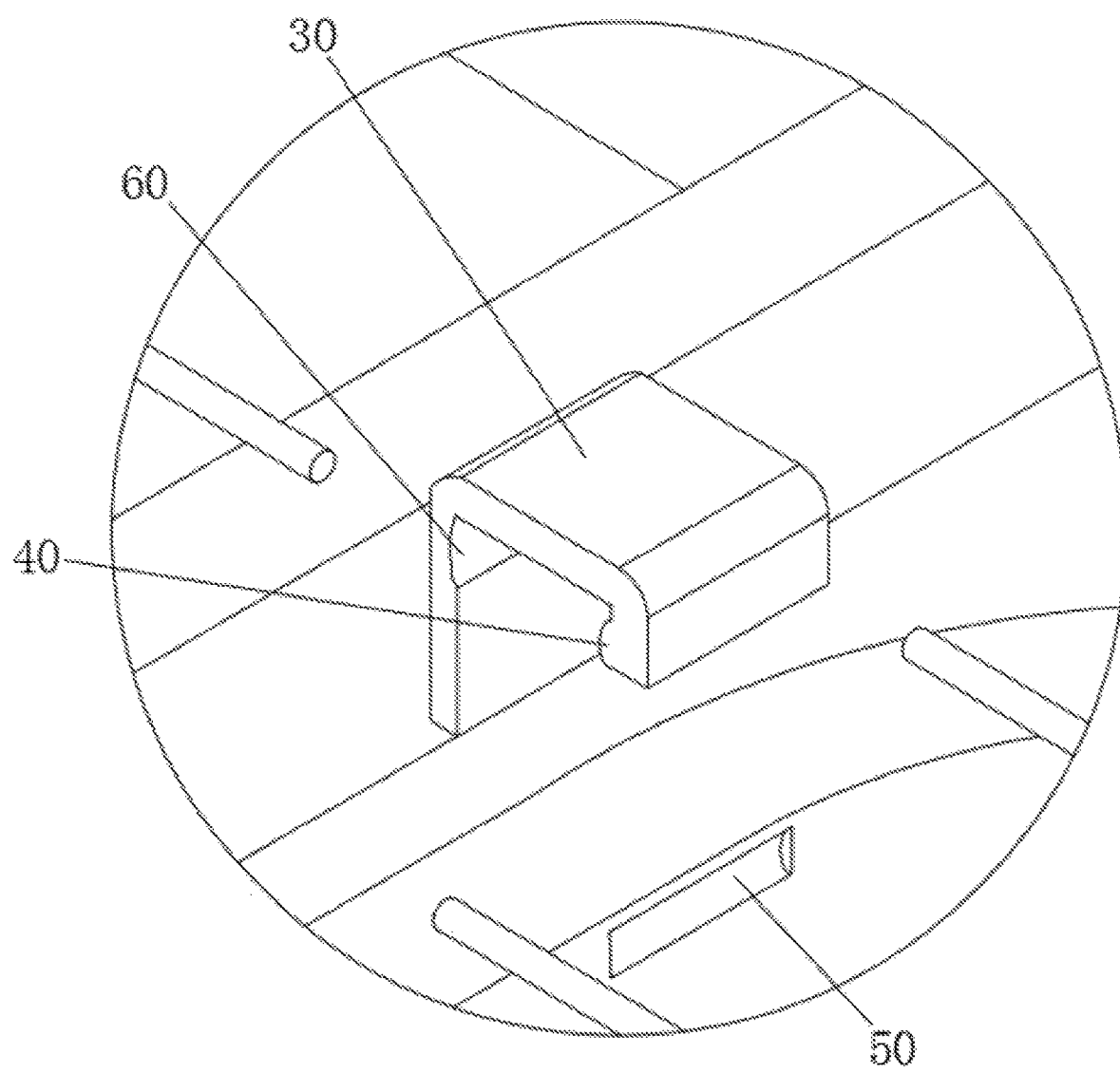
FIG. 10 is a schematic diagram showing separation of the bed body main unit and the bed body secondary unit in FIG. 8.

Referring to FIG. 8, FIG. 9 and FIG. 10, a protrusion part 40 is arranged at the bottom of the vertical section of the connector 30, an end face of the protrusion part 40 is semi-circular, and a groove 50 fitting the protrusion part 40 is arranged in the cross beam of the side face of the bed body main unit 10; specifically, a circular arc surface 60 taking an axis of the protrusion part 40 as a circle center is arranged on an inner surface of one side, opposite to the protrusion part 40, of the connector, and the radius of the circular arc surface 60 is equal to a distance between a corner of the cross beam of the side face of the bed body main unit 10 and the axis of the protrusion part 40; when the protrusion part 40 is inserted into the groove 50, the axis of the protrusion part 40 and an axis of the groove 50 are superposed, and a distance between the axis of the protrusion part 40 and the inner surface of the horizontal section of the connector 30 is equal to a distance between the axis of the groove 50 and a top surface of the cross beam of the side face of the bed body main unit 10; in a bed body assembling procedure, the protrusion part is inserted into the groove 50, the connector rotates by taking the axis of the protrusion part as the center such that the connector 30 can be clamped to the cross beam of the side face of the bed body main unit 10, the bed body secondary unit 20 follows up the connector to move, and when it swings to be level with the bed body main unit 10, the assembly of the bed body main unit 10 and the bed body secondary unit 20 can be achieved; when the bed body secondary unit 20 is detached from the bed body main unit 10, the bed body secondary unit 20 is directly rotated upwards, and the bed body secondary unit 20 drives the connector to rotate such that the bed body secondary unit 20 can be detached from the bed body main unit 10; in Embodiment 1, Embodiment 2 and Embodiment 3, the size of the clamping area S1 fits the size of the cross beam of the side face of the bed body main unit 10 or the size of the cross beam of the side face of the bed body main unit 20, and during assembly, the clamping area S1 needs to be aligned to the cross beam of the side face of the bed body main unit 10 or the cross beam of the side face of the bed body secondary unit 20 such that effectively assembly can be achieved, so assembly difficulty of the bed body is improved; but in Embodiment 4, the size of the clamping area S1 fits the size of the cross beam of the side face of the bed body main unit 10, and during assembly, one end of the connector 30 can keep still due to the matching of the protrusion part 40 and the groove 50, so, only the bed body secondary unit 20 needs to rotate, and the clamping area S1 does not need to be aligned to the cross beam of the side face of the bed body main unit 10, thereby reducing the assembly difficulty; moreover, when the bed body secondary unit 20 rotates, the bed body secondary unit 20 and the connector 30 as a whole body rotate by taking the protrusion part 40 as a supporting point, and by utilizing the lever principle and self weight of the bed body secondary unit 20, the assembly of the bed body main unit 10 and the bed body secondary unit 20 is more labour-saving and convenient; secondly, the groove 50 fits the protrusion part 40, and after the bed body secondary unit 20 and the bed body main unit 10 are assembled, the groove 50 can limit the protrusion part 40 in a length direction of the protrusion part 40, so that the connection between the bed body secondary unit 20 and the bed body main unit 10 is more stable; furthermore, a length of the vertical section, located on the inner side of the bed body main unit 10, of the connector 30 is less than the length of the vertical section, located on the outer side of the bed body main unit 10, of the connector 30, so, in one aspect, deformation resistance of the connector 30 can be improved by reducing the length of the vertical section of the connector 30, and in the other aspect, the use amount of materials for processing the connector 30 can be reduced so as to reduce the processing cost.

In conclusion, according to the bed body of the present disclosure, due to the detachable connection of the bed body main unit 10 and the bed body secondary unit 20, the size of the bed body can be reduced, the transportation cost of the bed body can be reduced, and connection of the bed body main unit 10 and the bed body secondary unit 20 is more convenient and has better stability.

The foregoing displays and describes, the basic principles, the main features and the advantages of the present disclosure. Persons skilled in the art should know that the present disclosure is not limited by the above embodiments. The above embodiments and the specification merely describe the principle of the present disclosure. The present disclosure further has various changes and improvements without departing from the principle of the present disclosure, and these changes and improvements should fall in the protection scope of the present disclosure. The protection scope of the present disclosure is limited by the appended claims and their legal equivalents.

What is claimed is:
1. A bed body, comprising a bed body main unit (10) and a bed body secondary unit (20) arranged on one side face of the bed body main unit (10), wherein the bed body main unit (10) is connected with the bed body secondary unit (20) through connectors (30), and the bed body secondary unit (20) is detachably clamped to the bed body main unit (10) through the connectors (30), each connector (30) configured to receive a cross beam of a side face of the bed body main unit (10); wherein each connector (30) is L-shaped and comprises a horizontal section and a vertical section extending vertically from a first end of the horizontal section, a second end of the horizontal section is fixedly connected with the bed body secondary unit (20), a rectangular channel groove (70) is defined in an inner surface of the vertical section, a first engagement tooth (80) is fixed in the channel groove (70), a second engagement tooth (90) engaged with the first engagement tooth (80) is fixed on the cross beam of the side face of the bed body main unit (10), a cross section of each of the first engagement tooth (80) and the second engagement tooth (90) is a right triangle, each of the first engagement tooth (80) and the second engagement tooth (90) comprises an inclined surface, when the second engagement tooth (90) is inserted into the channel groove 70, the inclined surface of the second engagement tooth (90) is leaned against the inclined surface of the first engagement tooth (80), and the cross beam of the side face of the bed body main unit (10) is received in the connector (30).

2. The bed body according to claim 1, wherein the connector (30) is an L-shaped clamping plate.

3. The bed body according to claim 1, wherein the second end of the horizontal section of the connector (30) is fixedly connected with an upper surface of a cross beam of a side face of the bed body secondary unit (20), a clamping area is formed between the inner surface of the vertical section of the connector (30) and the cross beam of the side face of the bed body secondary unit (20), and the clamping area is configured to receive the cross beam of the side face of the bed body main unit (10).

4. The bed body according to claim 1, wherein one end of the channel groove (70) is closed.

5. The bed body according to claim 4, wherein each of the first engagement tooth (80) and the second engagement tooth (90) further comprises four vertical surface connected to the inclined surface, one side, away from the closed end of the channel groove (70), the first engagement tooth (80) and the second engagement tooth (90) is inclined downwards.

6. The bed body according to claim 1, wherein the second end of the horizontal section of the connector (30) is fixedly connected with a lower surface of a cross beam of a side face of the bed body secondary unit (20), a clamping area is formed between the inner surface of the vertical section of the connector (30) and the cross beam of the side face of the bed body secondary unit (20), and the clamping area is configured to receive the cross beam of the side face of the bed body main unit (10).

7. A bed body, comprising a bed body main unit (10) and a bed body secondary unit (20) detachably clamped to the bed body main unit (10) through connectors (30), each connector (30) configured to receive a cross beam of a side face of the bed body main unit (10); wherein each connector (30) is U-shaped and comprises a horizontal section, a first vertical section extending vertically from a first end of the horizontal section, and a second vertical section extending vertically from a second end of the horizontal section, the first vertical section is longer than the second vertical section; the first vertical section is fixedly connected with the bed body secondary unit (20), a semicircular protrusion part (40) is extended horizontally from a bottom of the second vertical section toward the first vertical section, a semicircular groove (50) is defined in the cross beam of the side face of the bed body main unit (10), and a radius of the protrusion part (40) is equal to a radius of the groove (50); and when the protrusion part (40) is inserted into the groove (50), an axis of the protrusion part (40) and an axis of the groove (50) are superposed, and the cross beam of the side face of the bed body main unit (10) is received in the connector (30).

8. The bed body as claimed in claim 7, wherein the connector (30) is a clamping plate formed by channel steel.

9. The bed body as claimed in claim 7, wherein a circular arc surface (60) taking an axis of the protrusion part (40) as a circle center is defined in an inner surface of the first vertical section, and near the first end of the horizontal section; and a radius of the circular arc surface (60) is equal to a distance between a top corner of the cross beam of the side face of the bed body main unit (10) near the first end of the horizontal section and the axis of the protrusion part (40), when the cross beam of the side face of the bed body main unit (10) is received in the connector (30).

10. The bed body as claimed in claim 7, wherein an outer surface of the first vertical section is fixedly connected with a cross beam of a side face of the bed body secondary unit (20), a clamping area is formed between inner surfaces of the connector (30), and the clamping area is configured to receive the cross beam of the side face of the bed body main unit (10).

11. The bed body as claimed in claim 7, wherein a distance between the axis of the protrusion part (40) and an inner surface of the horizontal section is equal to a distance between the axis of the groove (50) and a top surface of the cross beam of the side face of the bed body main unit (10).

\* \* \* \* \*